US010265906B2

(12) United States Patent
Gerhards et al.

(10) Patent No.: US 10,265,906 B2
(45) Date of Patent: Apr. 23, 2019

(54) DEVICE AND METHOD FOR TRANSPORTING AND HANDLING CONTAINERS

(71) Applicant: KHS Corpoplast GmbH, Hamburg (DE)

(72) Inventors: Martin Gerhards, Hamburg (DE); Thorsten Herklotz, Ahrensburg (DE); Dieter Klatt, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 99 days.

(21) Appl. No.: 15/302,626

(22) PCT Filed: Apr. 9, 2015

(86) PCT No.: PCT/EP2015/000752
§ 371 (c)(1),
(2) Date: Oct. 7, 2016

(87) PCT Pub. No.: WO2015/154880
PCT Pub. Date: Oct. 15, 2015

(65) Prior Publication Data
US 2017/0028610 A1 Feb. 2, 2017

(30) Foreign Application Priority Data
Apr. 10, 2014 (DE) ........................ 10 2014 005 321

(51) Int. Cl.
*B29C 49/42* (2006.01)
*B65G 47/84* (2006.01)
*B65G 29/00* (2006.01)
*B65G 47/86* (2006.01)
*B29C 49/06* (2006.01)
(Continued)

(52) U.S. Cl.
CPC ...... *B29C 49/4236* (2013.01); *B29C 49/4205* (2013.01); *B65G 29/00* (2013.01);
(Continued)

(58) Field of Classification Search
CPC ............ B29C 49/4205; B29C 49/4236; B65G 47/847
See application file for complete search history.

(56) References Cited

U.S. PATENT DOCUMENTS 4,076,071 A 2/1978 Rosenkranz et al.
4,824,359 A 4/1989 Poehlsen
(Continued)

FOREIGN PATENT DOCUMENTS

CH 678616 A5 10/1991
DE 2352926 A1 4/1975
(Continued)

OTHER PUBLICATIONS

Partial machine translation of DE 10 2006 023 531 A1 dated Nov. 2007 obtained from the espace website. (Year: 2007).*

*Primary Examiner* — Robert B Davis
(74) *Attorney, Agent, or Firm* — Rankin, Hill & Clark LLP

(57) ABSTRACT

The invention relates to a device and a method for transporting and handling containers, in particular containers made of a thermoplastic material. The containers are transported from an inlet point (41) to an outlet point (30) in a transport direction by the transport device. The transport device has at least one handling device (26) which moves in the transport direction for handling one or more of the containers in a simultaneous manner in particular, and the handling device (26) is arranged in a movable manner relative to the transport device in order to move in a direction which deviates from the transport direction. The invention is characterized in that the transport device has at least one motor (32, 34, 37), by means of which the at least one handling device (26) can be moved in a motor-driven manner in the direction which deviates from the transport direction.

18 Claims, 2 Drawing Sheets

Figure 1:
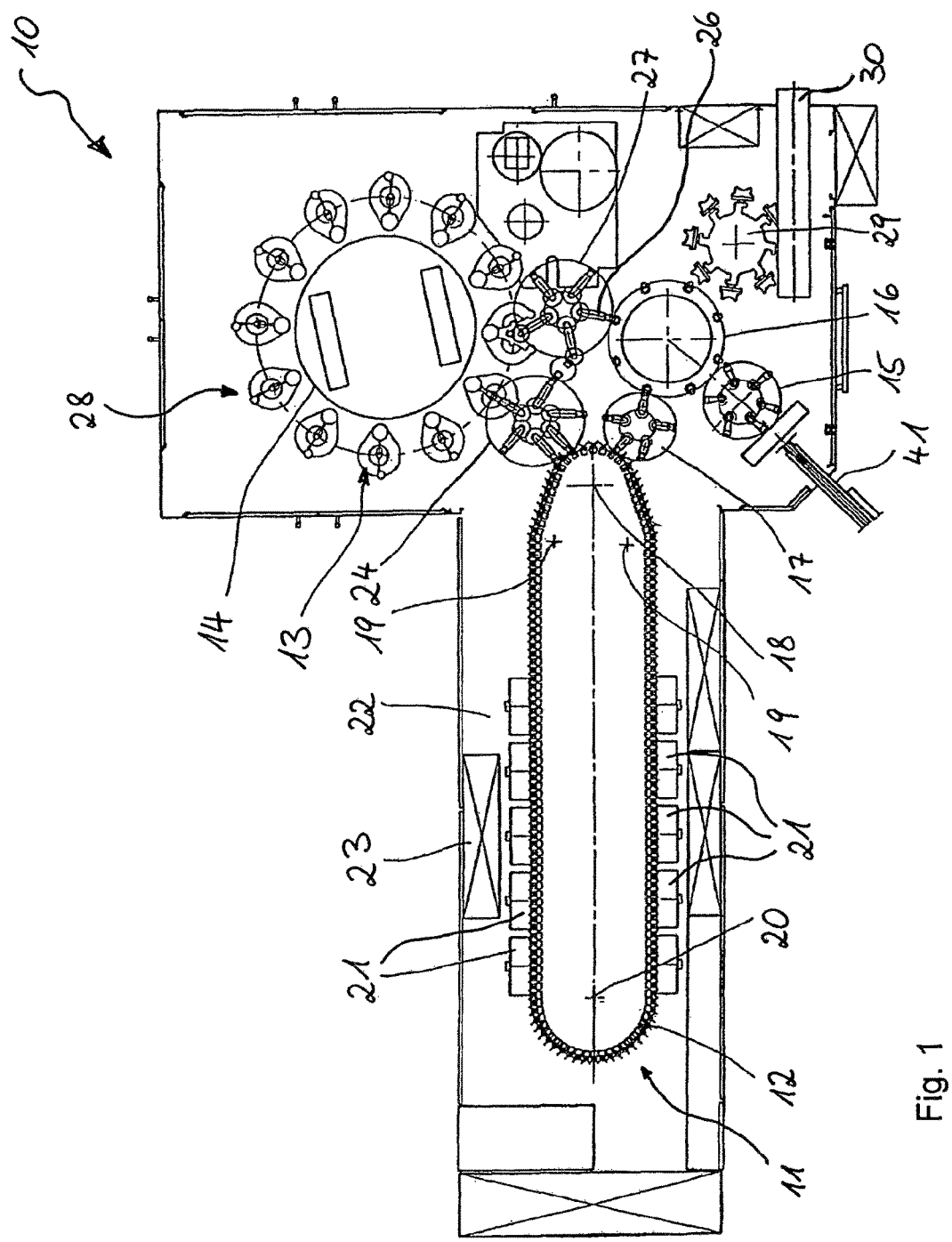

(51) Int. Cl.
  *B29C 49/36* (2006.01)
  *B29K 667/00* (2006.01)
  *B29L 31/00* (2006.01)

(52) U.S. Cl.
  CPC ......... *B65G 47/842* (2013.01); *B65G 47/847* (2013.01); *B29C 49/06* (2013.01); *B29C 49/36* (2013.01); *B29K 2667/003* (2013.01); *B29L 2031/7158* (2013.01); *B65G 2201/0247* (2013.01)

(56) References Cited

U.S. PATENT DOCUMENTS

| | | | |
|---|---|---|---|
| 5,346,386 A | 9/1994 | Albrecht et al. | |
| 5,383,461 A | 1/1995 | Aoki et al. | |
| 8,807,330 B2 * | 8/2014 | Kraus | B65G 47/847 198/478.1 |
| 2011/0056809 A1 | 3/2011 | Borgatti et al. | |
| 2012/0285800 A1 | 11/2012 | Kraus | |
| 2013/0062163 A1 | 3/2013 | Turlotte et al. | |
| 2013/0243895 A1 | 9/2013 | Zacche | |

FOREIGN PATENT DOCUMENTS

| | | |
|---|---|---|
| DE | 4212583 A1 | 10/1993 |
| DE | 4340201 A1 | 5/1994 |
| DE | 19906438 A1 | 8/2000 |
| DE | 102006023531 A1 | 11/2007 |
| DE | 102008013380 A1 | 9/2009 |
| DE | 102011101255 A1 | 11/2012 |
| WO | 2009144664 A2 | 12/2009 |

\* cited by examiner

DEVICE AND METHOD FOR TRANSPORTING AND HANDLING CONTAINERS

The invention relates to a device for transporting and handling containers. In addition the invention relates to a method for transporting and handling containers.

Devices and methods according to the invention for transporting and handling containers usually serve to transport the containers from an input point to an output point. The corresponding transport device has at least one handling device for simultaneous handling in particular of one or more containers. The transport device conveys the containers in the direction of conveyance, i.e., in the transport direction on the transport route between the input point and the output point. A treatment station for the containers may be provided on this transport route.

The transport device in question here and/or the method in question here may be designed for transport of containers of various types, in particular transport of parisons and containers produced from them. In particular the transport devices in question here and the methods are those which are used, for example, in blow-molding machines, for example, those of a rotating design, in which containers are produced by blow-molding parisons made of a thermoplastic material through the action of the blowing pressure. Containers made of a thermoplastic material, such as parisons made of PET (polyethylene terephthalate) in particular, are preferably used. These parisons are sent to different processing stations within a blow-molding machine. Such a blow-molding machine typically has a heating device as well as a blowing device, in the area of which the previously thermostatically regulated parison is expanded by biaxial orientation to form a container. This expansion takes place with the help of compressed air, which is introduced into the parison to be expanded. The sequence of such an expansion of a parison from the standpoint of the process engineering is explained in German Patent DE 43 40 201 A1. The aforementioned introduction of the gas under pressure also includes introduction of pressure into the blow-molded container being formed as well as the introduction of compressed gas into the parison at the start of the blow-molding operation.

The basic design of a blow-molding station for shaping a container is described in DE 42 12 583 A1. Possibilities of thermostatic regulation of the parisons are described in DE 23 52 926 A1.

Within the device for blow-molding, the parisons as well as the blow-molded containers can be transported and handled with the help of various transport devices and various handling devices. The use of transport mandrels on which the parisons are placed has proven successful in particular. However, the parisons may also be handled with other carrying devices. The use of gripper means for handling parisons and the use of spreading mandrels, which can be inserted into the mouth area of the parison to hold it, are also part of the available systems.

The transport and handling of containers using transfer wheels are described in DE 199 06 438 A1, for example, with an arrangement of the transfer wheel between a blow-molding wheel and an output section. The transport device according to the invention may thus be a transfer wheel in particular, which may also be arranged in another position in the blow-molding machine, for example, upstream from the heating device and/or between the heating device and the blow-molding device and/or downstream from the blow-molding device.

The aforementioned handling upstream from the parisons takes place first of all in the so-called two-step process in which the parisons are first produced by an injection molding method, then stored temporarily and only later conditioned with regard to their temperature and blown up to form a container. Secondly there is an application in the so-called one-step method, in which the parisons are immediately subjected to a suitable temperature regulation after they have been produced by an injection molding technology and after adequate solidification and then the blow molding is carried out.

With regard to the use of blow-molding stations, a variety of embodiments are known. In the case of blow-molding stations arranged on rotating transport wheels, a bay-type opening capacity of the mold carriers is often encountered. However, it is also possible to use mold carriers that are displaceable relative to one another or are guided in other ways. In the case of stationary blow-molding stations, which are suitable in particular for accommodating a plurality of cavities for molding containers, plates arranged in parallel to one another are typically used as the mold carriers.

For the transport and handling of the parisons and for transport and handling of the blow-molded containers, so-called transfer wheels which are equipped with carrying elements as handling devices for the parisons or bottles are often used within the blow-molding machine. The carrying elements may either grip the parisons or bottles directly or may convey separate transport elements which in turn hold the parisons or bottles directly. To support transfer operations, the carrying elements are typically mounted so they are pivotable relative to the transfer wheel. In addition, a telescoping function is frequently also implemented. To stipulate the position for the carrying elements, cam controllers are generally used in the state of the art. The carrying elements are therefore passed by stationary cams with so-called cam rollers. Similar arrangements of carrying elements and/or handling equipment may also be provided in other regions of the blow-molding machine.

One problem in the use of such carrying elements that are mounted to pivot with respect to the transfer wheel or other transport devices is that whenever mechanical problems occur, in particular when there are collisions, serious damage may occur but this is to be prevented. Use of overload couplings as the known solution makes the system more expensive and also makes the moving transport elements difficult and in particular makes the transfer wheels unnecessary.

Another core problem with such a blow-molding machine may be regarded as the fact that a high accuracy must be ensured in synchronization of the transport elements engaging with one another and keeping the transport elements synchronized with one another. Both overload couplings and minor deviations in rotational speeds and the like quickly result in asynchronous running of the individual movable parts including the transport elements. This results in inaccuracies in the transfer of the containers to be transported and to be processed or may even result in forced shutdown of the machine if the deviations become too great.

Moreover individual partial elements of the blow-molding machine must be linked in a complicated manner to the other modules to ensure synchronized running of the partial elements. This requires substantial installation effort and adjustment complexity due to the required fine tuning of the cams responsible for the synchronized running.

By way of clarification it should be pointed out that the term container which has been used in the claims is intended to include both parisons and the containers produced from them.

The object of the present invention is to improve upon a device and a method of the type defined in the introduction in such a way that with a simple structural design and with a low installation cost, a high operating reliability can be ensured.

This object is achieved according to the invention by a transport device as claimed and by a method as claimed.

According to this, the transport device has at least one handling device, which is designed to be motorized and can be moved and/or pivoted by motor. This motorized mobility of the handling equipment is provided instead of a cam control. It permits in particular a simple adaptation of the movements of the individual movable parts to one another. The handling equipment and/or carrying arms may thus be brought into engagement with one another in synchronization by a motorized action, for example, for transfer of the containers or for processing of the containers in a processing station.

As another advantage, it is apparent that the handling devices may be moved individually and as needed into the desired positions. Therefore it is possible, for example, to move the handling equipment into a safety position where the risks of collision can be ruled out reliably, for example, when there is a risk of collision, emergency shutdown or controlled shutdown or startup of a machine. This may take place by way of a controller but no additional control cams need be provided. It is also possible to bring individual handling items of equipment that no longer operate properly, for example, into a position in which no handling operations can be carried out any longer. It is also conceivable that all the handling devices may no longer be needed, for example, when switching to new container sizes so that, for example, some of the handling equipment is brought into a resting position and no longer participates in the handling and transfer operations.

Within the scope of the invention, a resting position means in particular a position or positioning of a handling device, in which it is disengaged or unmoving with respect to all other machine elements. For the example of a transport device which is designed as a transfer wheel, in which, when used as intended, the handling device accommodates a container in a first transfer region or transfer point and delivers the container in a second transfer region or at a second transfer point, the resting position in particular is selected, so that a collision of the handling device in the region of the transfer regions/transfer points with any machine parts present there and with any containers that may optionally be present is reliably prevented, despite the rotation of the transfer wheel. If the handling device also includes a telescoping and/or pivoting carrying arm, for example, then the carrying arm is preferably telescopically retracted in the resting position and/or is pivoted toward the axis of rotation of the transfer wheel.

For safety reasons, there is also the intent to design the resting position, for example, by means of a suitable, in particular mechanical restoring device as a preferential position of the handling device so that the handling device assumes the resting position during disturbances in the motor drives. Suitable restoring devices may be designed to operate passively, for example, by means of suitable return springs. However, within the scope of the invention there is also the idea that a suitable restoring device will have active control members such as, for example, a pneumatic cylinder to actively move the handling device into the resting position on occurrence of a fault or detection of an error state or because of an error signal transmitted to the control.

It is also regarded as an advantage that any handling device can be triggered individually according to the invention and independently of other handling devices. Therefore the movement of the handling device need not be constant over time, as is the case with the cam controls customary in the past but may also be adapted to varying conditions because an additional degree of freedom is available in the control of the handling devices.

The method according to the invention is characterized, like the device already described, in that the transport device is equipped with at least one motor for the drive of the handling means, wherein the handling means are connected to the motor in such a way that they can be drive by it, so that they can be moved by motor in a direction different from the transport direction. The terms "handling means" and "handling device" are used synonymously here.

The movement of the handling devices, which is carried out by motor drive, is a movement which is added to the basic transport movement carried out by the transport device, which therefore need not correspond in its direction to the transport direction of the transport device. This movement of the handling device, which is carried out by motor, takes place in particular in relation to the transport device.

Each of the handling devices is preferably movable separately by motor. This permits movement of the handling devices independently of one another. Each of the handling devices especially preferably has an assigned separate drive. Therefore, in particular at least one motor may be provided. The motor may be, for example, an electric motor, a hydraulic motor, a pneumatic motor or a similar drive motor. Servo motors in particular may also be considered.

More preferably each of the handling devices has at least one degree of freedom, preferably several degrees of freedom. This means that the handling device can preferably be moved about at least one axis, preferably about several axes and/or along at least one axis, preferably along several axes. One drive is preferably assigned to each axis and/or each degree of freedom. This drive is especially preferably at least one separate drive and/or motor drive. This means that in particular each direction of movement and/or each degree of freedom can be moved separately by motor and/or can be pivoted by motor.

Each handling device preferably has two degrees of freedom, so that free positionability in two dimensions and/or in one plane can be implemented. For example, this involves one degree of freedom of translational movement, in particular a telescoping movement or a translational movement and one degree of freedom of rotational movement, for example, a rotational movement or a pivoting movement.

Electromagnetic linear motors are suitable in particular as a suitable motor or drive for one degree of freedom in translational movement. Likewise, electromagnetic torque motors have proven to be especially advantageous drives for a degree of freedom in rotational movement. Both linear motors and torque motors are characterized advantageously by a compact design and a high adjustment accuracy with a high load-bearing capacity and low wear accordingly.

Each of the handling devices is especially preferably controllable by means of a control device. The control device is preferably an electronic controller, in particular a computer controller and/or a process computer controller. More preferably, each of the handling devices is controllable by means of an assigned and/or separate and/or central control device. This means that a central or decentralized controller stipulates all or at least some essential control commands for the handling devices. Essential information for the controller can be forwarded and/or processed by the control devices. A distributed and/or decentralized control of the handling devices may preferably also be provided.

A control system in which each motor or at least each handling device ensures a separate control unit for positioning the motor and/or the handling device based on external control signals is particularly advantageous. Individual adaptations such as zero point position and calibrations of the individual motors may be taken into account by the respective control unit. This ensures that comparable units comprising a motor and/or a handling device, on the one hand, and a control unit, on the other hand, will always behave the same, so that a rapid and uncomplicated replacement is ensured in the event of damage.

However, the external control signals are preferably supplied by a central control device, so it is possible to ensure that all handling devices of the transport device according to the invention will behave as desired in accordance with the stipulations of the individual case.

In particular, at least one sensor and/or at least one sensor device is provided for determining information about the handling device. These devices make it possible in particular to determine at least one position, one setting and/or one state of the handling device. Sensors and/or sensor arrays serve in particular to determine the current position, final position, working positions and/or resting positions and/or settings and/or arrangements of the handling devices relative to one another. For example, optical, acoustic, electrical or similar sensors may be provided for this purpose. They may preferably be embodied as contact lists and/or noncontact sensors or as sensors requiring contact. The sensors may be arranged on the handling devices, for example, or the handling devices may move past the sensors. It is also possible implement the two in combination and to use both stationary sensors and sensors moving along with the devices.

The movement of at least a few, preferably all, handling devices relative to one another is synchronized in particular. Preferably the synchronization is accomplished by means of at least one central control device, for example, within the context of a control system including control devices as described above. Alternatively or additionally, communication of multiple control devices with one another and/or with sensors may also be used for synchronization of the assigned handling devices. To do so, the control devices are suitably connected to one another to exchange information about the current state and/or the chronological sequence of the movement of the handling devices.

The transport device may be designed, for example, as a conveyor, in particular as a continuous conveyor or as a transfer wheel, for example, having transport arms. The transport device has at least one handling device which may be designed in particular as a transport arm, especially as gripper or a transport mandrel. The handling device is preferably mounted, so that it is movable and/or pivotable with respect to the transport device. The mounting of the system is preferably carried out according to the embodiments described above.

The handling device is arranged to be movable in particular with respect to the transport device. The handling device is in particular pivotable by motor. In this way, the handling device may be moved accordingly to a corresponding counterpart to receive and/or transfer a container. The mobility and/or pivotability also ensure(s) that a desired positioning in a processing station is made possible in an operating position.

The handling device is preferably designed to carry out at least one longitudinal movement and/or at least one rotational movement and/or at least one pivoting movement. Preferably at least one motor is provided to carry out these movements. A longitudinal movement may be implemented in particular by a linear motor. A rotational movement is preferably driven by means of a torque motor. A pivoting movement is carried out in particular by a servo motor. In addition to these types of motors, as mentioned above, which are also interchangeable with one another, other suitable types of motors may also be used.

The device according to the invention also permits a movement and/or a pivoting relative to the transport device. This ensures that adjustment and position correction of the containers are made possible. The handling device may be moved in a suitable manner for positioning it and/or for transport of the containers in the context of its own mobility in addition to the movement of the transport device. This readily permits corrections in the positioning.

The handling device is moved and/or pivoted by motor with respect to the transport device in particular. The handling device can be pivoted and/or moved about multiple axes and/or along multiple axes. Thus accurate positioning and balancing in several directions in space are possible with respect to the position. The movement preferably takes place in ongoing operation for compensation of fluctuations in the operating sequence. This may also take place in order to prevent interference states, for example, by pivoting handling equipment out of collision areas in a targeted manner.

Additionally, the position and/or condition of the handling equipment and/or the transport devices is/are preferably detected by means of at least one sensor and/or by means of at least one sensor array. A corresponding position and/or condition determination is necessary in particular in order to be able to respond suitably to deviations from the ideal condition. If necessary, compensation of the deviation in the actual position from the ideal position is ensured by means of suitable tracking of the handling equipment and readjustment by means of the motor drives.

The movement of the handling equipment and/or of the transport device is particularly preferably controlled by at least one control device. The control device may be, on the one hand, central control equipment, which is used for a group of or even for all control tasks. Alternatively and/or additionally, decentralized control systems may be provided. These are typically assigned as separate control devices to each handling device or to groups of handling devices. This permits joint control of a plurality of handling devices. Multiple control devices must be networked together and/or interconnected in a suitable manner for the communication. If necessary, programming of the data exchange is to be provided for this purpose.

In particular, control of the movement of the handling devices is performed as a function of the operating condition of the blow-molding machine and/or of parts thereof. Particularly preferably the movement depends on the position and/or condition of at least one other handling device and/or an additional handling device and/or transport device. For example, this prevents two handling devices and/or transport devices from attempting to grip the same container for transport. A priority control may be implemented in this way in particular. It is also possible to implement collision prevention in this way.

For the transport devices according to the invention, which are designed as rotating or rotatable transfer wheels with at least one handling device, which can be moved into a resting position, the invention also makes it possible to carry out the following operating procedure, which is particularly reliable and also has an independent inventive character.

In the operating method according to the invention for a machine having a transport device according to the invention, it is provided that in startup of the machine, the handling device and/or the handling devices, inasmuch as they are present, are first to be moved into the respective resting position before the transport device that is designed as a transfer wheel is accelerated up to an ideal rotational speed. This effectively prevents undefined or unsynchronized states of the machine and/or of the transport device, which might lead to a collision of the handling device and/or handling devices with any other machine components during the startup and/or during the acceleration. It is thus possible first to ensure that the transport device is rotating in synchronization with the machine, in particular with any additional rotating wheels that might also be present on the machine before the handling device or handling devices are moved out of the respective resting position to be used and/or utilized as intended.

Figure 2:
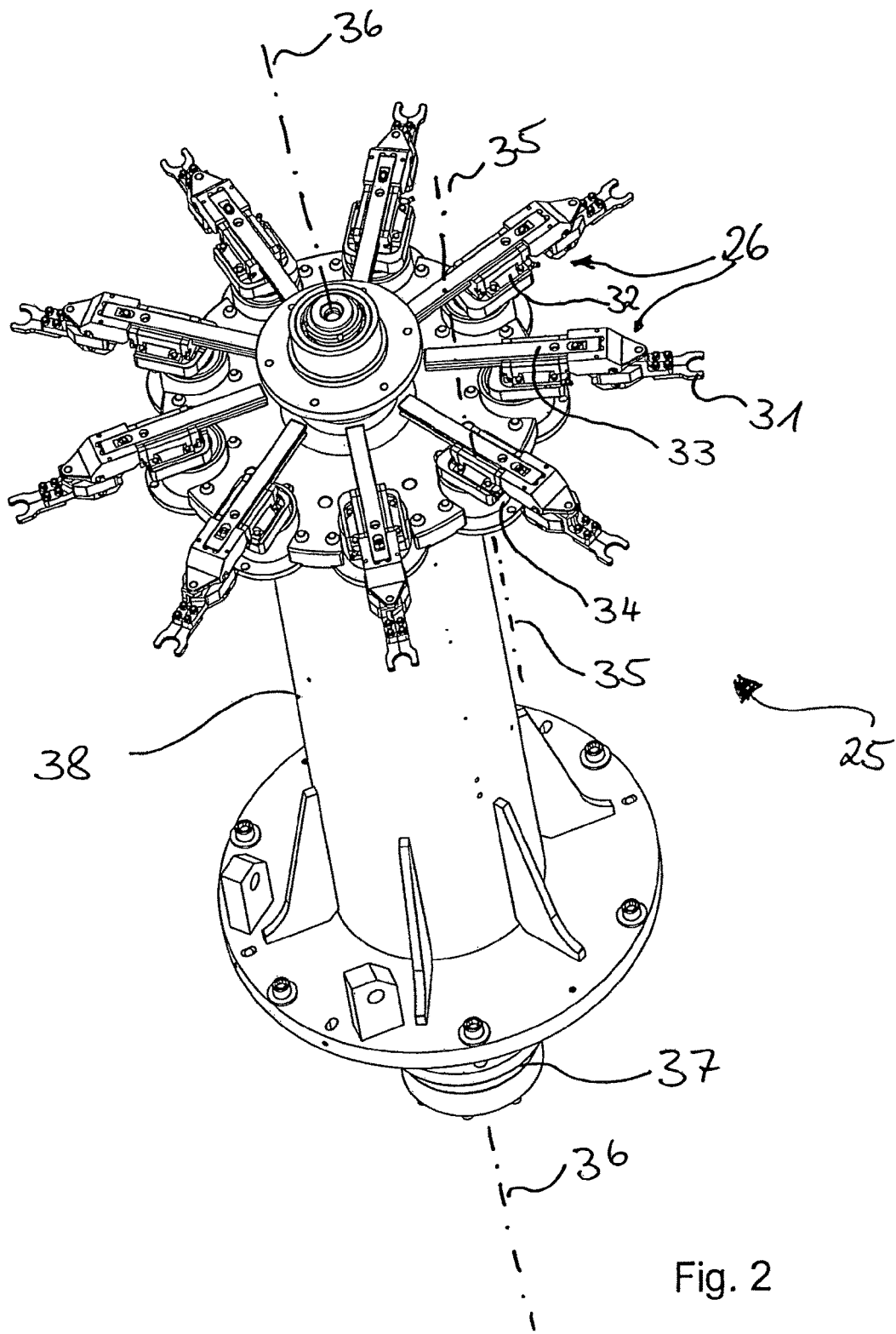

A preferred exemplary embodiment of the present invention is described in greater detail below on the basis of drawings, in which:

FIG. 1 shows a transport device according to the invention, namely in a blow-molding machine for thermoplastic containers, and FIG. 2 shows a perspective diagram of a transfer station according to the invention having pivotable handling devices.

FIG. 1 shows a device 10 for blow molding of containers (not shown in detail here). The blow-molding machine 10 has various processing stations and/or processing modules, which fulfill various purposes. An elongated heating oven 11, which is shown in the left elongated region of the blow-molding machine 10 and provides a heating zone, serves the purpose of thermal conditioning of the parisons. The heating oven 11 has a revolving conveyor chain 12, which can accommodate a plurality of parisons and can transport them along heating devices 21.

Another processing station inside the blow-molding machine 10 forms the blow-molding wheel 14, which has a plurality of blow-molding stations 13. Within the blow-molding stations 13, the drawing and expansion of so-called parison take place by means of compressed air. The parisons are sent to the blow-molding station 13 after thermal conditioning in the heating oven 11 and then they leave the blow-molding station 13 as finished blow-molded containers.

For transfer of parisons and/or containers between the conveyor chain 12 of the heating oven 11 and the blow-molding wheel 14 as well as for transfer of parisons and/or blow-molding containers produced from them between different processing stations of the blow-molding machine 10 the so-called transfer wheels 15, 16, 17, 24, 27, 29 also serve to transfer the parisons. These transfer wheels receive containers at an input point 41 and transfer the containers to an output point 30. The transfer wheel 17 receives the incoming parisons from the transfer wheel 16 at a transfer point and, after one revolution of approx. 180°; it transfers the parisons to the conveyor chain 12 in the region of a first pulley 18 having two additional supporting wheels 19. On the opposite end of the oval movement path spanned by the conveyor chain 12, another deflecting roller 20 is set up to ensure a stable and appropriate revolution of the conveyor chain 12. Heating devices 21 are also provided in the region of the linear path of the conveyor chain 12. These serve to provide temperature regulation of the parisons conveyed past them. These heating devices 21 are usually designed as heating boxes, which are arranged together one after the other and form a heating zone 22. In the region of the heating zone 22, a fan 23 may also be provided, serving to provide correct temperature control of the containers in interaction with the heating devices.

As soon as the containers have been brought to the desired temperature and optionally have the desired temperature profile, an input wheel 24 as part of the transfer station 25 receives the containers with the help of carrying arms 26 and conveys the containers to the blow-molding wheel 14.

The blow-molding wheel 14 has blow-molding stations 13 each having blowing molds designed in multiple parts each, held by blow-molding carriers 28. A parison is inserted into each blow-molding station 13 and is expanded by means of compressed air to form finished containers. The blowing molds surround the parisons and the expansion takes place until the widening container comes in contact with the inside wall of the blowing mold.

By means of an output wheel 27 with additional carrying arms 26, the finished blow-molded containers are then taken from the blow-molding wheel 14 and sent to an output zone 30 via the transfer wheel 16 and the transfer wheel 29.

As can be seen in FIG. 1, the carrying arms 26 of the input wheel 24 as well as the carrying arms of the output wheel 27 are arranged so that they are pivotable with respect to the latter. Reference is made in this regard to FIG. 2, which shows a transfer station 25 in detail. The other transfer wheels may be designed in the same way.

The carrying arms 26 of the transfer wheel 25 have gripper-type handling elements in the form of holding clamps 31. These serve to grip one container each, for example, at the neck ring of a container.

The carrying arms 26 themselves are displaceable by means of a linear motor 32 essentially radially to the transfer station 25. Adjustability of the holding clamps 31 arranged on the ends of the carrying arms that are on the outside radially, so that they can be displaced in the tangential direction, is carried out by a torque motor 34 and a corresponding axis of rotation 35, which are arranged in parallel with the central axis of rotation 36 of the transfer station 25. For rotation of the transfer station 25 on the whole a servo motor 37 is provided in the region of the central axis of rotation 36. This servo motor 37 is located in the interior of the cylinder 38 as a housing of the transfer station 25 in the present exemplary embodiment. The carrying arms 26 revolve together with the transfer station 25, so that the holding clamps 31 execute a basic circular movement.

The carrying arms 26 of the transfer station 25 can be adjusted independently of one another about their respective axis of rotation 35 as well as along their respective linear drive 33 adjusted independently of one another. In addition to the rotation of the transfer station 25 about its axis of rotation 36, superimposed movements may thus be carried out, for example, to compensate for minor lack of synchronicity of the rotation of the transfer station 25, the blow-molding wheel 14 and the conveyor chain 12 of the heating oven 11.

To determine the current position of transport arms and/or optionally of the containers, sensors are required. These sensors are not shown in detail either in FIG. 1 or in FIG. 2. They serve to detect, for example, the current position of a container and to move the carrying arm assigned to it to the corresponding position by means of control devices that are also not shown.

In contrast with an approach by means of a simple cam control with rollers on an external cam path, with the approach according to the invention it is possible to respond in a flexible manner at any time to deviations from the ideal position. Emergency stops and similar interruptions in production are therefore necessary much less often. Moreover the individual transfer and processing steps within the blow-molding machine can be carried out with a greater precision because the positioning of the carrying arms 26, for example, and/or the holding clamps 31 attached to them can be controlled at any time.

If necessary, yet other axes may be added for motorized mobility. In particular, some of the transfer wheels can be replaced by suitable carrying arms or robot arms. This would then require a greater degree of robot intelligence to move the containers in a suitable manner between the individual processing stations of the blow-molding machine by means of transfer wheels, as explained on the example of the transfer station 25, for example.

The controllers that are not shown in the drawings here may be provided separately for each carrying arm 26. This is recommended because the control tasks are always identical. To achieve the greatest possible security in the interaction of the individual components, networking and/or communication of the individual control devices is/are regarded as advantageous. Alternatively, a central control device may also be provided, evaluating all the parameters and positions and controlling them accordingly.

The features that are suitable and described here, in particular the features of the carrying arms 26 that are movable by means of motors, can also be transferred to other comparable machines. The exemplary embodiment shown here shows merely for the sake of simplicity a specific type of machine. Other machines that work with transfer stations 25 can also be equipped with this technology.

The invention claimed is:

1. A transport device for transporting and handling containers in a transport direction between an input point and an output point of a blow-molding machine, said transport device comprising:
   a transfer wheel that is rotatable about a central axis by a motor; and
   a plurality of handling devices that are configured to rotate together with the transfer wheel;
   wherein each of the plurality of handling devices comprises
      a carrying arm having a longitudinal axis and an end, and
      a handling element arranged on the end of the carrying arm,
   wherein each handling element is configured to independently handle one of the containers,
   wherein each carrying arm is movable linearly in directions parallel to its longitudinal axis by and with respect to a linear motor arranged on the transfer wheel and associated with said carrying arm, and
   wherein each carrying arm is also pivotable on a pivot axis that is parallel to the central axis by a torque or servo motor arranged on the transfer wheel and associated with said carrying arm.

2. The transport device according to claim 1, wherein each of the plurality of handling devices is individually movable using at least one of the linear motor and the torque or servo motor from an operational position into a safety position.

3. The transport device according to claim 1, wherein movement of each of the plurality of handling devices is controlled by a separately assigned control device.

4. The transport device according to claim 1, wherein at least one sensor or a sensor array is provided for determining a position and/or a setting of each of the plurality of handling devices.

5. The transport device according to claim 1, wherein movement of at least a few of the plurality of handling devices relative to one another is synchronized by at least one central control device or by communication of a plurality of control devices with one another and/or with sensors.

6. The transport device according to claim 1, wherein at least one handling element is a gripper or a transport mandrel.

7. The transport device according to claim 1, wherein a treatment station for containers is arranged between the input point and the output point.

8. The transport device according to claim 7, wherein the treatment station is selected from the group consisting of a heating device, a blow-molding device, a filling device, a sterilization device, an inspection device, a cleaning device, a locking device and a labeling device.

9. A blow-molding machine comprising a transport device according to claim 1.

10. A method for transporting and handling containers in a transport direction between an input point and an output point of a blow-molding machine, said method comprising:
   providing a transport device according to claim 1;
   rotating the transfer wheel using the motor;
   gripping the containers, one at a time, at the input point; and
   sequentially releasing the containers, one at a time, at the output point;
   wherein each individual container is gripped by the handling element arranged on the end of the carrying arm of one of the plurality of handling devices rotating with the transfer wheel as the individual container is transported from the input point to the output point via rotation of the transfer wheel.

11. The method according to claim 10, further comprising pivoting at least one carrying arm of one of the plurality of handling devices that is not gripping a container on a pivot axis that is parallel to the central axis by a torque or servo motor associated with said carrying arm.

12. The method according to claim 11, further comprising moving at least one carrying arm of one of the plurality of handling devices that is not gripping a container from an operational position into a safety position using at least one of the linear motor and the torque or servo motor associated with said carrying arm.

13. The method according to claim 10, further comprising separately controlling movement of each of the plurality of handling devices using a separately assigned control device.

14. The method according to claim 10, further comprising determining a position and/or a setting of each of the plurality of handling devices using at least one sensor or a sensor array.

15. The method according to claim 10, further comprising synchronizing the movement of at least a few of the plurality of handling devices relative to one another using at least one central control device or using communications with a plurality of control devices with each other and/or with sensors.

16. The method according to claim 10, wherein gripping is carried out using a gripper or a transport mandrel.

17. The method according to claim 10, further comprising treating the containers in a treatment station as they are being transported between the input point and the outpoint point.

18. The method according to claim 17, wherein the treatment station is selected from the group consisting of a heating device, a blow-molding device, a filling device, a sterilization device, an inspection device, a cleaning device, a locking device and a labeling device.

* * * * *